US011097361B2

(12) United States Patent
Tanaka et al.

(10) Patent No.: US 11,097,361 B2
(45) Date of Patent: Aug. 24, 2021

(54) INDEXABLE CUTTING TOOL

(71) Applicant: OSG CORPORATION, Toyokawa (JP)

(72) Inventors: Yusuke Tanaka, Toyokawa (JP); Takuma Aoyama, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 95 days.

(21) Appl. No.: 16/610,594

(22) PCT Filed: Aug. 9, 2017

(86) PCT No.: PCT/JP2017/028949
§ 371 (c)(1),
(2) Date: Nov. 4, 2019

(87) PCT Pub. No.: WO2019/030862
PCT Pub. Date: Feb. 14, 2019

(65) Prior Publication Data
US 2020/0198019 A1    Jun. 25, 2020

(51) Int. Cl.
*B23C 5/02*    (2006.01)
*B23C 5/00*    (2006.01)

(52) U.S. Cl.
CPC ........ *B23C 5/006* (2013.01); *B23C 2210/282* (2013.01)

(58) Field of Classification Search
CPC .. B23C 5/006; B23C 5/00; B23C 5/02; B23C 5/109; B23C 5/1081; B23C 2210/282; B23C 2210/287; B23C 2210/168
See application file for complete search history.

(56) References Cited

U.S. PATENT DOCUMENTS 5,083,887 A * 1/1992 Dotany ................... B23C 5/109
                                                                 407/48
7,399,146 B2   7/2008 Long, II et al.
(Continued)

FOREIGN PATENT DOCUMENTS

CN    1468164 A    1/2004
CN    1860002 A    11/2006
(Continued)

OTHER PUBLICATIONS

Notification of Transmittal of Translation of the International Preliminary Report on Patentabililty (Form PCT/IB/338) issued in counterpart International Application No. PCT/JP2017/028949 dated Feb. 13, 2020 with Forms PCT/IPEA/409. (5 pages).

(Continued)

*Primary Examiner* — Ryan Rufo
(74) *Attorney, Agent, or Firm* — Westerman, Hattori, Daniels & Adrian, LLP (57) ABSTRACT

An indexable cutting tool in which cutting ability can be ensured while suppressing the occurrence of chatter vibration. In outer circumferential blades provided on a tool main body, the axial rake angles are all set to the same angle, and so are the radial rake angles. With this configuration, the cutting ability of an indexable cutting tool can be ensured. Furthermore, the disposing intervals, in the circumferential direction of the tool main body, of the plurality of outer circumferential blades that are provided in, at least, a first groove of a plurality of groove are set to unequal values. With this configuration, it is possible to make the intervals at which the outer circumferential blades adjoining in the axis direction contact a workpiece unequal, suppressing resonance of periodic vibration occurring in cutting and, thus, suppressing the occurrence of chatter vibration.

7 Claims, 3 Drawing Sheets

(56) References Cited

U.S. PATENT DOCUMENTS

| | | | |
|---|---|---|---|
| 8,096,734 B2 | 1/2012 | Sjoo | |
| 8,246,278 B2 | 8/2012 | Horiike et al. | |
| 8,613,574 B2 | 12/2013 | Waggle et al. | |
| 8,621,964 B2 | 1/2014 | Filho et al. | |
| 8,696,257 B2 | 4/2014 | Saito et al. | |
| 8,807,881 B2 | 8/2014 | Itoh et al. | |
| 8,905,685 B2 | 12/2014 | Horiike et al. | |
| 9,028,177 B2 | 5/2015 | Horiike et al. | |
| 2005/0084341 A1 | 4/2005 | Long, II et al. | |
| 2005/0089379 A1* | 4/2005 | Francis | B23C 5/109 407/48 |
| 2017/0197257 A1 | 7/2017 | Aso | |
| 2018/0071840 A1 | 3/2018 | Suzuki et al. | |
| 2020/0269325 A1* | 8/2020 | Zhao | B23C 5/207 |

FOREIGN PATENT DOCUMENTS

| | | | |
|---|---|---|---|
| CN | 101462184 A | 6/2009 | |
| CN | 101511515 A | 8/2009 | |
| CN | 101945723 A | 1/2011 | |
| CN | 102099139 A | 6/2011 | |
| CN | 102341203 A | 2/2012 | |
| CN | 103128353 A | 6/2013 | |
| CN | 106825714 A | 6/2017 | |
| JP | H081427 A | 1/1996 | |
| JP | 2004-510594 A | 4/2004 | |
| JP | 2012-20394 A | 2/2012 | |
| JP | 2016-190274 A | 11/2016 | |
| WO | 02-28604 A1 | 4/2002 | |
| WO | WO-2012163338 A1 * | 12/2012 | ........... B27G 13/002 |
| WO | 2015/098973 A1 | 7/2015 | |
| WO | 2016/158980 A1 | 10/2016 | |

OTHER PUBLICATIONS

Office Action dated Mar. 26, 2020, issued in counterpart CN Application No. 201780089466.5, with English Translation. (11 pages).

International Search Report dated Oct. 24, 2017, issued in counterpart International Application No. PCT/JP2017/028949 (2 pages).

\* cited by examiner

INDEXABLE CUTTING TOOL

TECHNICAL FIELD

The present invention relates to an indexable cutting tool. More specifically, the present invention relates to an indexable cutting tool that can inhibit the occurrence of chatter vibration and secure cutting ability.

BACKGROUND ART

There is a technique in which the axial rake angles and the radial rake angles of the respective ones of a plurality of outer circumferential blades of an indexable cutting tool are made different from each other, so that the periodic vibrations during the cutting process are prevented from being resonated to inhibit the occurrence of chatter vibration (Patent Literature 1).

CITATION LIST

Patent Literature

Patent Literature 1: Japanese Translation of PCT International Application Publication No. JP-T-2004-510594 (paragraph 0024, FIG. 4, and the like)

SUMMARY OF INVENTION

Technical Problem

However, in the above conventional indexable cutting tool, since the axial rake angles and the radial rake angles of the respective ones of the plurality of outer circumferential blades are made different from each other, a difference is caused between the cutting abilities of the respective outer circumferential blades. Consequently, there is a problem that the cutting ability of the indexable cutting tool is lowered accordingly.

The present invention has been made to solve the above problem, and an object of the present invention is to provide an indexable cutting tool that can inhibit the occurrence of chatter vibration and secure cutting ability.

Solution to Problem

To achieve this object, an indexable cutting tool of the present invention includes a tool main body rotated about an axis, a plurality of grooves recessed in groove shape turned along the outer circumferential face of the tool main body and extending in the axial direction and having turning directions respectively set to be the same with respect to the outer circumferential face of the tool main body, a plurality of bottom blades formed with cutting blades and disposed at one end in the axial direction of the tool main body in the grooves, and a plurality of outer circumferential blades formed with cutting blades and disposed at the other end side in the axial direction of the tool main body with respect to the bottom blades in the grooves. The axial rake angles of the outer circumferential blades are set to the same angle in the respective ones of the plurality of outer circumferential blades, the radial rake angles of the outer circumferential blades are set to the same angle in the respective ones of the plurality of outer circumferential blades, at least one groove of the plurality of grooves is configured as a first groove, disposing intervals in the rotation direction of the tool main body between the plurality of outer circumferential blades disposed in the first groove are set to two types of disposing intervals of a first interval and a second interval larger than the first interval, at least one groove of the plurality of grooves is configured as a second groove, disposing intervals in the rotation direction of the tool main body between the plurality of outer circumferential blades disposed in the second groove are set to two types of disposing intervals of a third interval and a fourth interval larger than the third interval, the disposing intervals between the outer circumferential blades in the first groove are repeated in the rotation direction of the tool main body in the order of the first interval and the second interval from the outer circumferential blade located at one end in the axial direction in the first groove, and the disposing intervals between the outer circumferential blades in the second groove are repeated in the rotation direction of the tool main body in the order of the fourth interval and the third interval from the outer circumferential blade located at one end in the axial direction in the second groove.

Advantageous Effects of Invention

In accordance with the indexable cutting tool of a first aspect of the present invention, at least one groove of the plurality of grooves is configured as a first groove, and disposing intervals in the rotation direction of the tool main body between the plurality of outer circumferential blades disposed in the first groove are set to be unequal, so that the timings at which the respective outer circumferential blades disposed in the first groove are abutted on a workpiece during the cutting process can be unequal. Thus, the vibrations transmitted to the tool main body during the cutting process for the workpiece at the respective outer circumferential blades disposed in the first groove can be irregular. As a result, there is an effect in which the periodic vibrations during the cutting process can be prevented from being resonated to inhibit the occurrence of chatter vibration.

Also, the axial rake angles of the plurality of outer circumferential blades are set to the same angle in the respective ones of the plurality of outer circumferential blades, and the radial rake angles of the outer circumferential blades are set to the same angle in the respective ones of the plurality of outer circumferential blades, so that the cutting abilities of the respective outer circumferential blades can be the same. As a result, there is an effect in which the cutting ability of the indexable cutting tool can be secured.

Also, a plurality of grooves have turning directions respectively set to be the same with respect to the outer circumferential face of the tool main body, disposing intervals in the rotation direction of the tool main body between the plurality of outer circumferential blades disposed in the first groove are set to two types of disposing intervals of a first interval and a second interval larger than the first interval, and those disposing intervals are successively repeated in the rotation direction of the tool main body, so that there is an effect in which it is possible to simplify the strength setting of the tool main body in the portions in which the plurality of outer circumferential blades are disposed.

That is, when all the disposing intervals between the plurality of outer circumferential blades in the rotation direction of the tool main body are different, the thickness of the tool main body from the portions in which the outer circumferential blades are disposed to the adjacent groove in the rotation direction of the tool main body is required to be secured for each of the portions in which the outer circumferential blades are disposed. Consequently, the strength setting of the tool main body is necessary in each of the portions in which the outer circumferential blades are disposed.

On the contrary, disposing intervals between the outer circumferential blades in the rotation direction of the tool main body are set to two types of values, and those values are successively repeated in the rotation direction of the tool main body, so that by performing the strength setting of the tool main body in the portions in which the outer circumferential blades of the two types of values are disposed, the strength setting of the tool main body in all the portions of the outer circumferential blades disposed in the first groove can be performed. Therefore, it is possible to simplify the strength setting of the tool main body in which the plurality of outer circumferential blades are disposed.

Also, disposing intervals in the rotation direction of the tool main body between the plurality of outer circumferential blades disposed in the first groove are set to two types of intervals of a first interval and a second interval larger than the first interval, so that the portion in which the disposing interval between the outer circumferential blades is set to the first interval and the strength of the tool main body is high and the portion in which the disposing interval between the outer circumferential blades is set to the second interval and the strength of the tool main body is low can be alternately set. Therefore, the portion in which the strength in the groove is low can be prevented from being concentrated on part of the tool main body. As a result, there is an effect in which the tool main body can be prevented from being damaged.

Also, at least one groove of the plurality of grooves is configured as a second groove, disposing intervals in the rotation direction of the tool main body between the plurality of outer circumferential blades disposed in the second groove are set to two types of disposing intervals of a third interval and a fourth interval larger than the third interval, the disposing intervals between the outer circumferential blades in the first groove are repeated in the order of the first interval and the second interval from the outer circumferential blade located at one end in the axial direction in the first groove, and the disposing intervals between the outer circumferential blades in the second groove are repeated in the order of the fourth interval and the third interval from the outer circumferential blade located at one end in the axial direction in the second groove, so that a separating distance in the rotation direction of the tool main body between the outer circumferential blades in the first groove and the second groove disposed in the same row (position) in the axial direction of the tool main body and a separating distance in the rotation direction of the tool main body between the outer circumferential blades in the first groove and the second groove disposed in the adjacent row (position) in the axial direction of the tool main body to those outer circumferential blades can be easily made different.

With this, the timings at which the respective outer circumferential blades disposed in the first groove and the respective outer circumferential blades disposed in the second groove are abutted on a workpiece during the cutting process can be unequal. Thus, the vibrations transmitted to the tool main body during the cutting process for the workpiece at the respective outer circumferential blades disposed in the first groove and the second groove can be irregular. As a result, there is an effect in which the periodic vibrations during the cutting process can be prevented from being resonated to inhibit the occurrence of chatter vibration.

In accordance with the indexable cutting tool of a second aspect of the present invention, in addition to the effect provided by the indexable cutting tool of the first aspect of the present invention, a value obtained by totaling the first interval and the second interval is set to a value obtained by totaling the third interval and the fourth interval, so that there is an effect in which the disposing intervals in the circumferential direction of the tool main body between the outer circumferential blades disposed in the first groove and the outer circumferential blades disposed in the second groove can be prevented from being increased.

In accordance with the indexable cutting tool of a third aspect of the present invention, in addition to the effect provided by the indexable cutting tool of the second aspect of the present invention, the first interval is set to a value different from the value of the third interval, and the second interval is set to a value different from the value of the fourth interval, so that there is an effect in which the periodic vibrations during the cutting process can be easily prevented from being resonated to easily inhibit the occurrence of chatter vibration.

In accordance with the indexable cutting tool of a fourth aspect of the present invention, in addition to the effect provided by the indexable cutting tool of the second aspect of the present invention, the first interval is set to the same value as the third interval, and the second interval is set to the same value as the fourth interval, so that there is an effect in which the periodic vibrations during the cutting process can be prevented from being resonated to inhibit the occurrence of chatter vibration.

In accordance with the indexable cutting tool of a fifth aspect of the present invention, in addition to the effect provided by the indexable cutting tool of the fourth aspect of the present invention, at least one groove of the plurality of grooves is configured as a third groove, all disposing intervals in the rotation direction of the tool main body between the plurality of outer circumferential blades disposed in the third groove are set to a fifth interval different from the first interval and the second interval, so that a separating distance in the rotation direction of the tool main body between the outer circumferential blades in the first groove and the third groove disposed in the same row (position) in the axial direction of the tool main body and a separating distance in the rotation direction of the tool main body between the outer circumferential blades in the first groove and the third groove disposed in the adjacent row (position) in the axial direction of the tool main body to those outer circumferential blades can be easily made different.

With this, the timings at which the respective outer circumferential blades disposed in the first groove and the respective outer circumferential blades disposed in the third groove are abutted on the workpiece during the cutting process can be unequal. Thus, the vibrations transmitted to the tool main body during the cutting process for the workpiece at the respective outer circumferential blades disposed in the first groove and the third groove can be irregular. As a result, there is an effect in which the periodic vibrations during the cutting process can be prevented from being resonated to inhibit the occurrence of chatter vibration.

In the third groove, the plurality of outer circumferential blades are disposed at equal intervals in the rotation direction of the tool main body, so that the strengths of the portions of the tool main body in which the outer circumferential blades are disposed can be set to be equal. With this, there is an effect in which the strength of the tool main body can be secured.

Also, in accordance with the fifth aspect, a separating distance in the rotation direction of the tool main body between the outer circumferential blades in the second groove and the third groove disposed in the same row (position) in the axial direction of the tool main body and a separating distance in the rotation direction of the tool main body between the outer circumferential blades in the second groove and the third groove disposed in the adjacent row (position) in the axial direction of the tool main body to those outer circumferential blades can be easily made different.

Therefore, the timings at which the respective outer circumferential blades disposed in the first groove, the respective outer circumferential blades disposed in the second groove, and the respective outer circumferential blades disposed in the third groove are abutted on the workpiece during the cutting process can be unequal. Thus, the vibrations transmitted to the tool main body during the cutting process for the workpiece at the respective outer circumferential blades disposed from the first groove to the third groove can be irregular. As a result, there is an effect in which the periodic vibrations during the cutting process can be prevented from being resonated to inhibit the occurrence of chatter vibration.

In accordance with the indexable cutting tool of a sixth aspect of the present invention, in addition to the effect provided by the indexable cutting tool of the fifth aspect of the present invention, the fifth interval is set to the average value of the first interval and the second interval, so that the volume of the tool main body from the disposing face of each of the outer circumferential blades disposed in the first groove to the groove adjacent to the first groove and the volume of the tool main body from the disposing face of each of the outer circumferential blades disposed in the third groove to the groove adjacent to the third groove can be easily equal. Thus, there is an effect in which the volumes of the tool main body between the respective grooves adjacent to each other in the rotation direction of the tool main body can be equal, thereby securing the rigidity of the tool main body.

In accordance with the indexable cutting tool of a seventh aspect of the present invention, in addition to the effect provided by the indexable cutting tool of the first aspect of the present invention, in the bottom blades, disposing intervals between the bottom blades in the rotation direction of the tool main body are respectively set to different intervals, so that the timings at which the bottom blades in the respective grooves are abutted on the workpiece during the cutting process can be unequal. Thus, the vibrations transmitted to the tool main body during the cutting process for the workpiece at the bottom blades in the respective grooves can be irregular. As a result, there is an effect in which the periodic vibrations during the cutting process can be prevented from being resonated to inhibit the occurrence of chatter vibration.

In accordance with the indexable cutting tool of an eighth aspect of the present invention, in addition to the effect provided by the indexable cutting tool of the seventh aspect of the present invention, a disposing interval in the rotation direction of the tool main body from each of the bottom blades to the outer circumferential blade adjacent to the bottom blade in the rotation direction of the tool main body is set to be larger than a disposing interval between the plurality of outer circumferential blades in the rotation direction of the tool main body, so that the thickness of the tool main body from the portion in which the bottom blade is disposed to the adjacent groove in the rotation direction of the tool main body is larger than the thickness of the portion in which the outer circumferential blade is disposed, so that the strength of the tool main body in the portion in which the bottom blade is disposed can be easily secured.

Therefore, although the radial force to the other side in the axial direction of the tool main body is applied to the bottom blade due to the contact with the cutting bottom face of the workpiece and the cutting resistance of the bottom blade is thus likely to be higher than the cutting resistance of the outer circumferential blade and the portion in which the bottom blade is disposed is thus likely to be damaged, the strength of the tool main body in the portion in which the bottom blade is disposed is secured, so that there is an effect in which the tool main body can be prevented from being damaged.

DESCRIPTION OF EMBODIMENTS

Figure 1A:
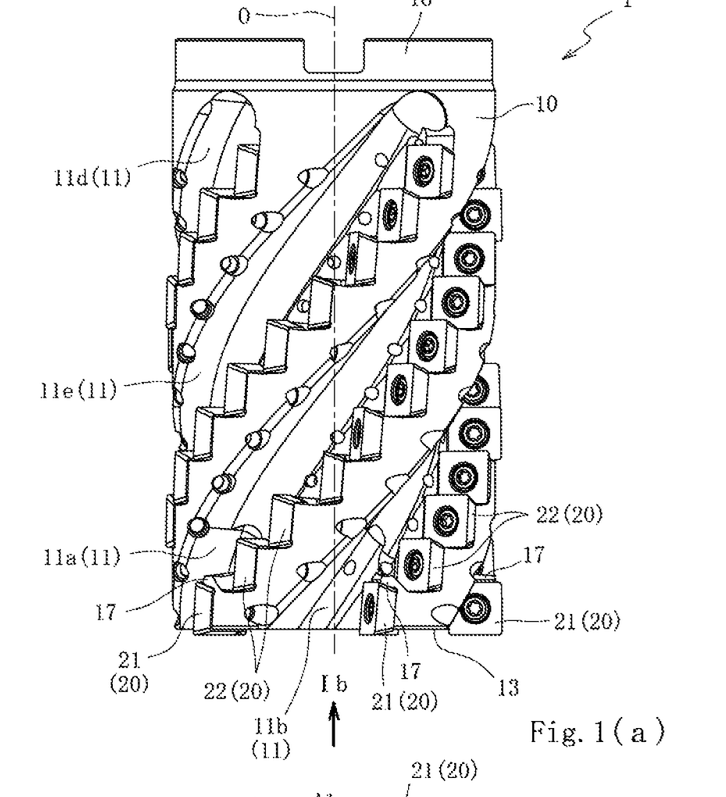
FIG. 1(a) is a front view of an indexable cutting tool according to a first embodiment.
Figure 1B:
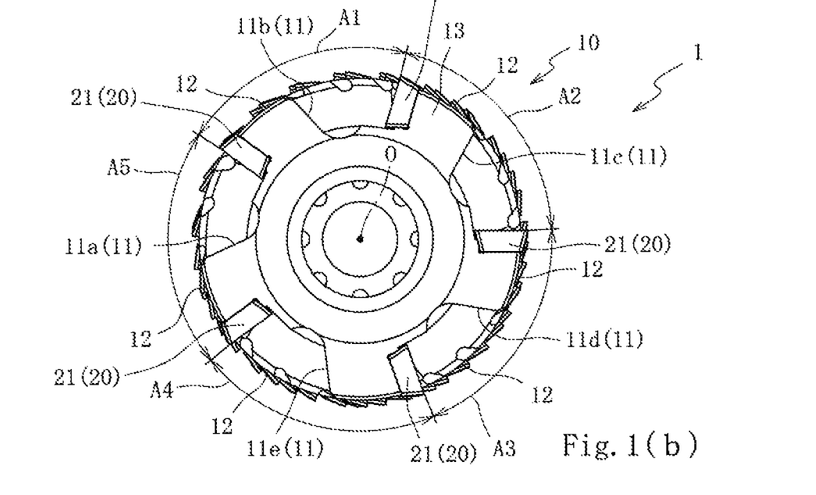
FIG. 1(b) is a bottom view of the indexable cutting tool viewed in the direction of Ib in FIG. 1(a)
Figure 2:
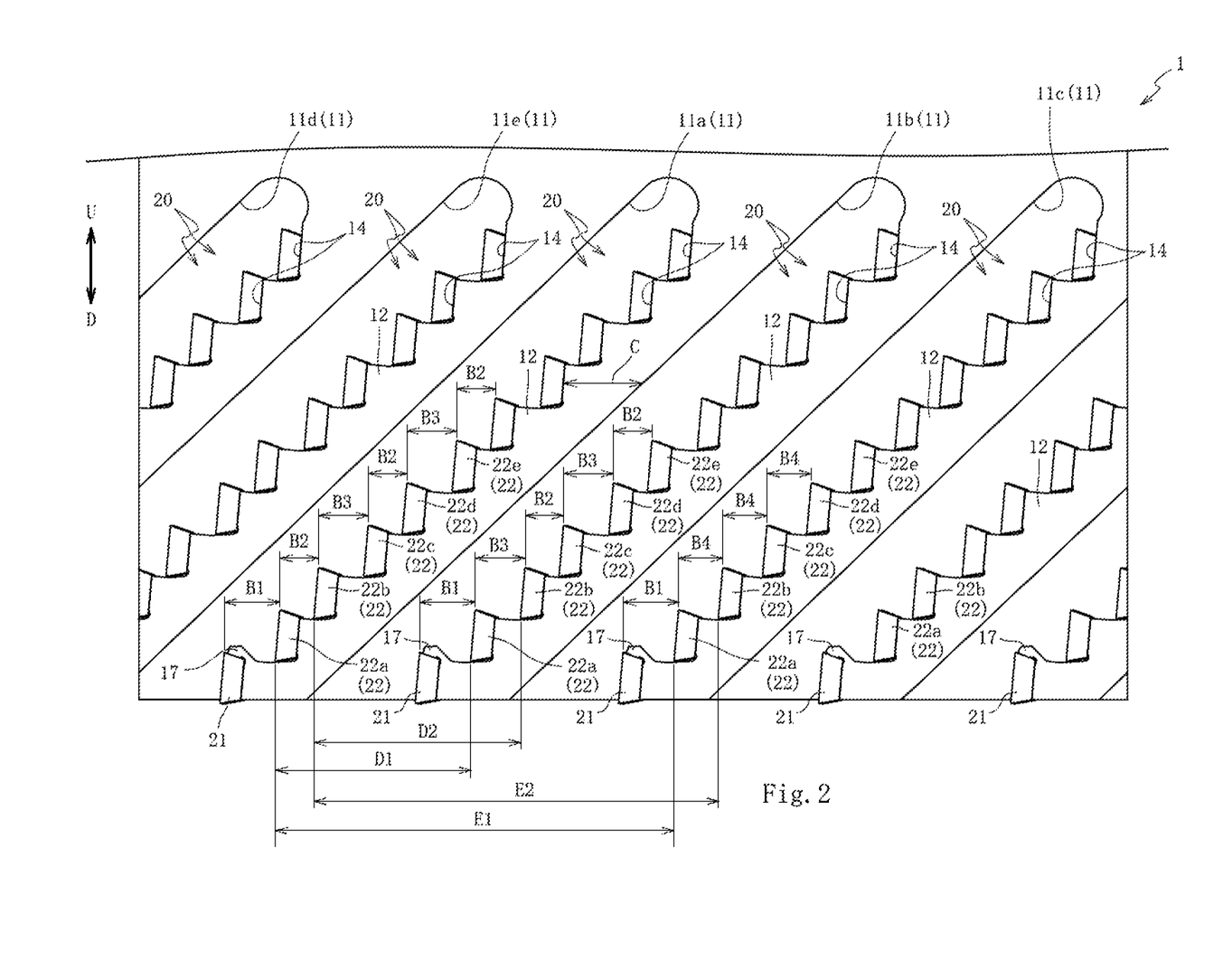
FIG. 2 is a schematic diagram developing the side face of the indexable cutting tool in the circumferential direction.

Hereinafter, preferred embodiments of the present invention will be described with reference to the accompanying drawings. First, referring to FIG. 1(a), FIG. 1(b), and FIG. 2 an indexable cutting tool 1 according to a first embodiment of the present invention will be described. FIG. 1(a) is a front view of the indexable cutting tool 1 according to the first embodiment, and FIG. 1(b) is a bottom view of the indexable cutting tool 1 viewed in the direction of Ib in FIG. 1(a). FIG. 2 is a schematic diagram developing the side face of the indexable cutting tool 1 in the circumferential direction.

It should be noted that in the following description, with respect to the indexable cutting tool 1 in the state illustrated in FIG. 1(a), the upper side in the sheet is the up side, and the lower side in the sheet is the down side. Further, the double-headed arrow U-D in the drawing indicates the up-down direction of the indexable cutting tool 1. Also, in FIGS. 1(a) and 1(b), the rotation axis of the indexable cutting tool 1 is illustrated by being indicated by the reference numeral of an axis O.

As illustrated in FIG. 1(a), FIG. 1(b), and FIG. 2, the indexable cutting tool 1 is a cutting tool that performs the cutting process for a die and the like by the rotation force transmitted from a working machine (not illustrated), such as a machining center, and mainly includes a tool main body 10, and a plurality (in this embodiment, 55) of tips 20 separated from the tool main body 10 and screw-held to the tool main body 10.

The tool main body 10 is formed of a substantially annular metal material in its entirety, and mainly includes a plurality (in this embodiment, five) of grooves 11 that are recessed inward in the radial direction on its annular outer circumferential face, protrusion faces 12 that are located between the plurality of grooves and form the outer circumferential face of the tool main body 10, an end face 13 on one side in the axial direction (the lower side in FIG. 1 (a)) of the tool main body 10, and a coupling section 16 that is formed on the other side in the axial direction (the upper side in FIG. 1(a)) of the tool main body 10 and is coupled to the working machine (not illustrated) providing the rotation force to the indexable cutting tool 1.

It should be noted that in the following description, the respective ones of the five grooves 11 are called a first groove 11a, a second groove 11b, a third groove 11c, a fourth groove 11d, and a fifth groove 11e in the order in which the first groove 11a, the second groove 11b, the third groove 11c, the fourth groove 11d, and the fifth groove 11e are recessed in the circumferential direction (about the axis O) of the tool main body 10.

Each of the first groove 11a to the fifth groove 11e is recessed in groove shape rotated (turned) to the right in the circumferential direction (about the axis O) of the tool main body 10 and extending in the axis O direction. It should be noted that the extending directions of the first groove 11a to the fifth groove 11e are respectively set to the same direction (The respective torsion angles of the first groove 11a to the fifth groove 11e are set to be the same).

Each of the first groove 11a to the fifth groove 11e includes a plurality of seating faces 14 in which the tips 20 are disposed on the side face on one side in the circumferential direction of the tool main body 10. It should be noted that in this embodiment, 11 seating faces 14 are formed in each of the grooves 11 (the first groove 11a to the fifth groove 11e). That is, 11 tips 20 are disposed in one groove 11.

Also, in the following description, the tip 20 disposed at the end on the down side (the side in the arrow D direction) of the tool main body 10 is called a bottom blade 21, and the tips 20 other than the bottom blade 21 are called outer circumferential blades 22. Also in the description, five outer circumferential blades 22 disposed on the down side of the tool main body 10 are respectively called a first outer circumferential blade 22a, a second outer circumferential blade 22b, a third outer circumferential blade 22c, a fourth outer circumferential blade 22d, and a fifth outer circumferential blade 22e from the lower end toward the up side (the side in the arrow U direction).

In the seating faces 14, the inclination angles with respect to the axis O of the seating faces 14 (on which the outer circumferential blades 22 are disposed) except for the seating face 14 (on which the bottom blade 21 is disposed) formed at the end on the down side (the arrow D direction) of the tool main body 10 are respectively set to be the same. With this, like the outer circumferential blades 22 disposed on the seating faces 14 except for the seating face 14 formed at the end on the down side of the tool main body 10, the disposing angles with respect to the axis O are respectively set to be the same.

That is, the axial rake angles and the radial rake angles of the respective outer circumferential blades 22 are respectively set to be the same each other. Therefore, the cutting abilities of the respective outer circumferential blades 22 when a workpiece is cutting processed can be the same. Thus, the axial rake angles and the radial rake angles of all the outer circumferential blades 22 can be respectively set to the angles optimum for cutting the workpiece. As a result, the cutting ability of the indexable cutting tool 1 can be secured.

It should be noted that to prevent the end surface on the down side (the arrow D direction) of the bottom blade 21 from being abutted on the cutting bottom face of the workpiece during the cutting process, the axial rake angle of the bottom blade 21 is set to a predetermined angle. With this, a gap is provided between the cutting bottom face of the workpiece and the end surface on the down side of the bottom blade 21, so that the end surface on the down side of the bottom blade 21 can be prevented from being abutted on the cutting bottom face of the workpiece during the cutting process. On the other hand, the axial rake angle of the outer circumferential blade 22 is set to be larger than the axial rake angle of the bottom blade 21. With this, the cutting ability of the outer circumferential blade 22 can be enhanced.

In the first groove 11a to the fifth groove 11e, the gaps between the grooves 11 adjacent to each other in the circumferential direction of the tool main body 10 are respectively set to different values. Therefore, as illustrated in FIG. 1 (b), separating distances A1 to A5 between the respective tips 20 (the bottom blades 21) disposed at the end on the down side of the tool main body 10 in the first groove 11a to the fifth groove 11e and the tips 20 adjacent to the respective tips 20 in the circumferential direction of the tool main body 10 are respectively set to different values (A1≠A2≠A3≠A4≠A5 (see FIG. 1(b)).

In this embodiment, the A1 is set to 25.0 mm (a center angle of approximately 71 degrees), the A2 is set to 25.7 mm (a center angle of approximately 73 degrees), the A3 is set to 24.8 mm (a center angle of approximately 71 degrees), the A4 is set to 25.8 mm (a center angle of approximately 73 degrees), and the A5 is set to 25.3 mm (a center angle of approximately 72 degrees). It should be noted that the center angle is the angle between both ends of each of the A1 to A5 about the axis O.

Then, the tips 20 disposed in the first groove 11a to the fifth groove 11e will be described in detail.

The tips 20 are disposed on the seating faces 14 from the first groove 11a to the fifth groove 11e, and are disposed in the state where their cutting blades are protruded outward in the radial direction of the axis O with respect to the tool main body 10. Also, the plurality of tips 20 disposed in one groove 11 are disposed to be distributed at predetermined intervals in the axis O direction, and are disposed in the same positions in the axial direction of the axis O as the tips 20 disposed in another groove 11. The tips 20 adjacent to each other in the axis O direction are disposed in the position where the up side of one of the tips 20 adjacent to each other and the down side of the other of the tips 20 adjacent to each other are overlapped in the circumferential direction of the tool main body 10.

Each of the bottom blades 21 is disposed in the position where its cutting blade is protruded downward (in the arrow D direction) with respect to the end of the end face 13 of the tool main body 10. With this, the workpiece can be prevented from coming into contact with the tool main body 10 when the workpiece is cut by the indexable cutting tool 1.

Also, the tool main body 10 includes an abutting section 17 that is abutted on the side face on the up side (the side in the arrow U direction) of the bottom blade 21. The abutting section 17 is protruded from the recess face of the groove 11, and the side face on the down side (in the arrow D direction) of the tool main body 10 is abutted on the side face on the up side of the bottom blade 21.

Disposing intervals B1 from the bottom blades 21 to the first outer circumferential blades 22a in the circumferential direction of the tool main body 10 (see FIG. 2) are set to be the same in the respective grooves 11 (the first groove 11a to the fifth groove 11e). All disposing intervals between the bottom blades 21 in the respective grooves 11 in the circumferential direction of the tool main body 10 are set to different values. Therefore, disposing intervals between the first outer circumferential blades 22a in the respective grooves 11 in the circumferential direction of the tool main body 10 are set to be the same as the disposing intervals between the bottom blades 21 in the respective grooves 11 in the circumferential direction of the tool main body 10. Thus, the disposing intervals between the first outer circumferential blades 22a in the respective grooves 11 in the circumferential direction of the tool main body 10 are respectively set to different values.

Then, the outer circumferential blades 22 disposed in the first groove 11a will be described. As illustrated in FIG. 2, in the outer circumferential blades 22 disposed in the first groove 11a, a disposing interval B2 in the circumferential direction of the tool main body 10 from the first outer circumferential blade 22a to the second outer circumferential blade 22b (see FIG. 2) is set to be a value smaller than the value of the disposing interval B1 in the circumferential direction of the tool main body 10 from the bottom blade 21 to the first outer circumferential blade 22a (see FIG. 2) (B1>B2), and is set to be a value smaller than the value of a disposing interval B3 in the circumferential direction of the tool main body 10 from the second outer circumferential blade 22b to the third outer circumferential blade 22c (see FIG. 2) (B3>B2).

A disposing interval in the circumferential direction of the tool main body 10 from the third outer circumferential blade 22c to the fourth outer circumferential blade 22d in the first groove 11a is set to be the same as the disposing interval B2 in the circumferential direction of the tool main body 10 from the first outer circumferential blade 22a to the second outer circumferential blade 22b in the first groove 11a.

A disposing interval in the circumferential direction of the tool main body 10 from the fourth outer circumferential blade 22d to the fifth outer circumferential blade 22e in the first groove 11a is set to be the same as the disposing interval B3 in the circumferential direction of the tool main body 10 from the second outer circumferential blade 22b to the third outer circumferential blade 22c in the first groove 11a.

Also, on the up side (the side in the arrow U direction) of the fifth outer circumferential blade 22e in the first groove 11a, disposing intervals in the circumferential direction of the tool main body 10 between the outer circumferential blades 22 adjacent to each other in the axis O direction are set to the disposing intervals such that the disposing interval B2 and the disposing interval B3 are successively repeated in the circumferential direction of the tool main body 10.

That is, the disposing intervals in the circumferential direction of the tool main body 10 between the outer circumferential blades 22 adjacent to each other in the axis O direction in the first groove 11a are set to the disposing intervals such that the disposing interval B2 and the disposing interval B3 are successively repeated from the first outer circumferential blade 22a side.

Here, since each of the outer circumferential blades 22 is the portion in which it comes into contact with the workpiece and cuts the workpiece, it is necessary to secure the distance from the seating face 14 on which the outer circumferential blade 22 is disposed to the adjacent groove 11 in the circumferential direction of the tool main body 10 (back metal) (a distance C of the protrusion face 12 in the circumferential direction of the tool main body 10 (see FIG. 2)), thereby securing the strength of the tool main body 10.

When all the disposing intervals between the outer circumferential blades 22 in the circumferential direction of the tool main body 10 are different, the strength setting of the tool main body 10 is necessary in the respective ones of the portions in which the respective outer circumferential blades 22 are disposed, but the disposing intervals between the outer circumferential blades 22 in the circumferential direction of the tool main body 10 are repeated (continued) at two types of disposing intervals, and by performing the strength setting of the tool main body 10 in the portions in which two outer circumferential blades 22 are disposed, the strength setting of the tool main body 10 in all the portions in which the outer circumferential blades 22 in one groove 11 are disposed can be performed. Therefore, it is possible to simplify the strength setting of the tool main body 10 in which the plurality of outer circumferential blades 22 are disposed.

Also, in the first groove 11a, the disposing intervals in the circumferential direction of the tool main body 10 between the outer circumferential blades 22 adjacent to each other in the axis O direction are formed of two types of disposing intervals of the disposing interval B2 and the disposing interval B3, so that the portion in which the disposing interval is made large (The back metal is made thin) and the strength of the tool main body 10 is set to be low and the portion in which the disposing interval is made small (The back metal is made thick) and the strength of the tool main body 10 is set to be high are alternately set. Therefore, the portion in which the strength of the tool main body 10 is low can be prevented from being concentrated on part of the tool main body 10. As a result, the tool main body 10 can be prevented from being damaged.

Then, the outer circumferential blades 22 disposed in the second groove 11b will be described. In the outer circumferential blades 22 disposed in the second groove 11b, a disposing interval in the circumferential direction of the tool main body 10 from the first outer circumferential blade 22a to the second outer circumferential blade 22b is set to be the same as the disposing interval B3 in the circumferential direction of the tool main body 10 from the second outer circumferential blade 22b to the third outer circumferential blade 22c disposed in the first groove 11a.

A disposing interval in the circumferential direction of the tool main body 10 from the second outer circumferential blade 22b to the third outer circumferential blade 22c in the second groove 11b is set to be the same as the disposing interval B2 in the circumferential direction of the tool main body 10 from the first outer circumferential blade 22a to the second outer circumferential blade 22b disposed in the first groove 11a.

A disposing interval in the circumferential direction of the tool main body 10 from the third outer circumferential blade 22c to the fourth outer circumferential blade 22d in the second groove 11b is set to be the same as the disposing interval B2 in the circumferential direction of the tool main body 10 from the first outer circumferential blade 22a to the second outer circumferential blade 22b in the second groove 11b.

A disposing interval in the circumferential direction of the tool main body 10 from the fourth outer circumferential blade 22d to the fifth outer circumferential blade 22e in the second groove 11b is set to be the same as the disposing interval B3 in the circumferential direction of the tool main body 10 from the second outer circumferential blade 22b to the third outer circumferential blade 22c.

Also, on the up side (the side in the arrow U direction) of the fifth outer circumferential blade 22e in the second groove 11b, disposing intervals in the circumferential direction of the tool main body 10 between the outer circumferential blades 22 adjacent to each other in the axis O direction are set to the disposing intervals such that the disposing interval B3 and the disposing interval B2 are successively repeated in the circumferential direction of the tool main body 10.

That is, the disposing intervals in the circumferential direction of the tool main body 10 between the outer circumferential blades 22 adjacent to each other in the axis O direction in the second groove 11b are set to the disposing intervals such that the disposing interval B3 and the disposing interval B2 are successively repeated from the first outer circumferential blade 22a side.

Then, the outer circumferential blades 22 disposed in the third groove 11c will be described. In the outer circumferential blades 22 disposed in the third groove 11c, a disposing interval B4 in the circumferential direction of the tool main body 10 from the first outer circumferential blade 22a to the second outer circumferential blade 22b is set to be smaller than the disposing interval B2 in the circumferential direction of the tool main body 10 from the first outer circumferential blade 22a to the second outer circumferential blade 22b in the first groove 11a, and is set to be larger than the disposing interval B3 in the circumferential direction of the tool main body 10 from the first outer circumferential blade 22a to the second outer circumferential blade 22b in the second groove 11b (B2>B4>B3).

Disposing intervals in the circumferential direction of the tool main body 10 between the outer circumferential blades 22 adjacent to each other in the axis O direction on the up side (the side in the arrow U direction) of the second outer circumferential blade 22b in the third groove 11c are set to the disposing interval B4 in the circumferential direction of the tool main body 10 from the first outer circumferential blade 22a to the second outer circumferential blade 22b. That is, in the outer circumferential blades 22 disposed in the third groove 11c, the disposing intervals in the circumferential direction of the tool main body 10 between the outer circumferential blades 22 adjacent to each other in the axis O direction are set to be the same.

Also, the disposing interval B4 is set to the value of half of an interval obtained by totaling the disposing interval B2 and the disposing interval B3 (the average value of the disposing interval B2 and the disposing interval B3) (B4=(B2+B3)/2). With this, it is possible to prevent the outer circumferential blades 22 disposed in the third groove 11c from being deviated in the circumferential direction of the tool main body 10 from the down side (the side in the arrow D direction) toward the up side (the side in the arrow U direction), as compared with the outer circumferential blades 22 disposed in the first groove 11a or the second groove 11b.

In this embodiment, the B1 is set to 6.9 mm (a center angle of approximately 20 degrees), the B2 is set to 4.8 mm (a center angle of approximately 14 degrees), the B3 is set to 6.2 mm (a center angle of approximately 18 degrees), and the B4 is set to 5.5 mm (a center angle of approximately 16 degrees). It should be noted that the center angle is the angle between both ends of each of the B1 to the B4 about the axis O.

Also, the disposing intervals between the outer circumferential blades 22 in the circumferential direction of the tool main body 10 in the fourth groove 11d are set to be the same as the disposing intervals between the outer circumferential blades 22 in the first groove 11a, and the disposing intervals between the outer circumferential blades 22 in the circumferential direction of the tool main body 10 in the fifth groove 11e are set to be the same as the disposing intervals between the outer circumferential blades 22 in the second groove 11b, and the detailed description thereof is omitted.

In the indexable cutting tool 1 configured as above, the disposing intervals in the circumferential direction of the tool main body 10 between the outer circumferential blades 22 disposed in the first groove 11a, the second groove 11b, the fourth groove 11d, and the fifth groove 11e are set to be unequal, so that the timings at which the outer circumferential blades 22 disposed in each of the first groove 11a, the second groove 11b, the fourth groove 11d, and the fifth groove 11e and adjacent to each other in the axis O direction are abutted on the workpiece during the cutting process by the indexable cutting tool 1 can be unequal. Thus, the vibrations transmitted to the tool main body 10 during the cutting process for the workpiece at the outer circumferential blades 22 disposed in the first groove 11a, the second groove 11b, the fourth groove 11d, and the fifth groove 11e can be irregular. As a result, the periodic vibrations during the cutting process can be prevented from being resonated to inhibit the occurrence of chatter vibration.

The order of the disposing intervals between the outer circumferential blades 22 in the circumferential direction of the tool main body 10 in the first groove 11a and the order of the disposing intervals between the outer circumferential blades 22 in the circumferential direction of the tool main body 10 in the second groove 11b are set to be opposite, so that the difference between a separating distance D1 in the circumferential direction of the tool main body 10 between the first outer circumferential blades 22a disposed in the same position (row) in the axis O direction in the first groove 11a and the second groove 11b (see FIG. 2) and a separating distance D2 in the circumferential direction of the tool main body 10 between the second outer circumferential blades 22b disposed in the same position (row) in the axis O direction in the first groove 11a and the second groove 11b (see FIG. 2) can be made large.

With this, the timings at which the outer circumferential blades 22 disposed in the first groove 11a and the outer circumferential blades 22 disposed in the second groove 11b are abutted on the workpiece during the cutting process can be unequal. Thus, the vibrations transmitted to the tool main body 10 during the cutting process for the workpiece at the outer circumferential blades 22 disposed in the first groove 11a and the second groove 11b can be irregular. As a result, the periodic vibrations during the cutting process can be prevented from being resonated to inhibit the occurrence of chatter vibration.

The disposing intervals in the circumferential direction of the tool main body 10 between the outer circumferential blades 22 disposed in the third groove 11c are set to the values different from the values of the disposing intervals in the circumferential direction between the outer circumferential blades 22 in the first groove 11a (and the second groove 11b), and the outer circumferential blades 22 disposed in the third groove 11c are disposed at equal intervals in the circumferential direction of the tool main body 10, so that a separating distance E1 in the circumferential direction of the tool main body 10 between the first outer circumferential blades 22a disposed in the same position in the axis O direction in the first groove 11a and the third groove 11c (see FIG. 2) and a separating distance E2 in the circumferential direction of the tool main body 10 between the second outer circumferential blades 22b disposed in the same position in the axis O direction in the first groove 11a and the third groove 11c (see FIG. 2) can be easily made different.

With this, the timings at which the outer circumferential blades 22 disposed in the first groove 11a and the outer circumferential blades 22 disposed in the third groove 11c are abutted on the workpiece during the cutting process can be unequal. With this, the vibrations transmitted to the tool main body 10 during the cutting process for the workpiece at the outer circumferential blades 22 disposed in the first groove 11a and the second groove 11b can be irregular. As a result, the periodic vibrations during the cutting process can be prevented from being resonated to inhibit the occurrence of chatter vibration.

The disposing interval B4 between the outer circumferential blades 22 in the third groove 11c in the circumferential direction of the tool main body 10 is set to the average value of the disposing interval B2 and the disposing interval B3 between the outer circumferential blades 22 in the first groove 11a in the circumferential direction of the tool main body 10, so that the volume of the tool main body 10 from each of the seating faces 14 on which each of the outer circumferential blades 22 in the first groove 11a is disposed to the second groove 11b adjacent to the first groove 11a, the volume of the tool main body 10 from each of the seating faces 14 on which each of the outer circumferential blades 22 in the second groove 11b is disposed to the third groove 11c adjacent to the second groove 11b, and the volume of the tool main body 10 from each of the seating faces 14 on which each of the outer circumferential blades 22 in the third groove 11c is disposed to the fourth groove 11d adjacent to the third groove 11c can be easily equal. Thus, the volumes of the tool main body 10 between the respective grooves 11 adjacent to each other in the circumferential direction of the tool main body 10 can be equal, thereby securing the rigidity of the tool main body 10.

Also, the volumes between the respective grooves 11 of the tool main body 10 adjacent to each other in the circumferential direction of the tool main body 10 can be equal, so that the center of gravity of the tool main body 10 can be easily set onto the rotation axis (the axis O) of the tool main body 10. With this, the tool main body 10 can be prevented from being deviated when the indexable cutting tool 1 is rotated. As a result, the cutting ability of the indexable cutting tool 1 can be prevented from being lowered.

In the respective bottom blades 21 disposed from the first groove 11a to the fifth groove 11e, the distances between the bottom blades 21 in the circumferential direction of the tool main body 10 are respectively set to the different values, so that the timings at which the respective bottom blades 21 are abutted on the workpiece during the cutting process can be unequal. Thus, the vibrations transmitted to the tool main body 10 during the cutting process for the workpiece at the respective bottom blades 21 can be irregular. As a result, the periodic vibrations during the cutting process can be prevented from being resonated to inhibit the occurrence of chatter vibration.

The disposing interval B1 in the circumferential direction of the tool main body 10 from the bottom blade 21 as each of the tips 20 to each of the first outer circumferential blades 22a disposed from the first groove 11a to the fifth groove 11e is set to be larger than the disposing intervals between the outer circumferential blades 22 in the circumferential direction of the tool main body 10 (from the disposing interval B2 to the disposing interval B4), so that it is possible to secure the distance C of each of the protrusion faces 12 from each of the seating faces 14 on which each of the bottom blades 21 is disposed to the adjacent groove 11 in the circumferential direction of the tool main body 10 (the back metal) (see FIG. 2). With this, the strength of the tool main body 10 in the portion in which the bottom blade 21 is disposed can be secured.

Here, in the tool main body 10, the up side (the side in the arrow U direction) is the coupling side to the machine (not illustrated) providing the rotation force to the indexable cutting tool 1, so that the down side (the side in the arrow D direction) is likely to be vibrated due to vibration and the like.

Consequently, when the tool main body 10 is vibrated due to vibration and the like during the cutting process, the cutting depth of each of the bottom blades 21 into the workpiece becomes large, so that the cutting resistance of the bottom blade 21 is likely to be high.

On the contrary, in this embodiment, the distance C of the portion in which the bottom blade 21 is disposed (the back metal) is increased to secure the strength of the tool main body 10, so that the tool main body 10 can be prevented from being damaged when the cutting resistance of the bottom blade 21 is high.

Also, each of the abutting sections 17 is protruded from the periphery of the disposing portion of each of the bottom blades 21 in which the distance C is set to be large, so that the distance between the abutting section 17 and each of the first outer circumferential blades 22a in the circumferential direction of the tool main body 10 can be secured. Therefore, the abutting section 17 can be prevented from being an obstacle to the cutting for the workpiece at the first outer circumferential blade 22a (For example, the chipping of the workpiece is unlikely to be removed from each of the grooves 11).

The largest difference between the disposing intervals between the bottom blades 21 in the respective grooves 11 in the circumferential direction of the tool main body 10 (A4−A3) is set to be smaller than the difference between the disposing intervals in the circumferential direction of the tool main body 10 between the outer circumferential blades 22 in the first groove 11a and the second groove 11b in the same position in the axis O direction (the doubled-headed arrow U-D direction) (D2−D1). With this, the disposing intervals in the circumferential direction of the tool main body 10 between the outer circumferential blades 22 adjacent to each other in the axis O direction in the first groove 11a and the second groove 11b can be prevented from being the same.

Then, referring to FIG. 3, the indexable cutting tool 1 according to a second embodiment will be described. In the first embodiment, the case where the disposing intervals between the respective outer circumferential blades 22 in the first groove 11a and the second groove 11b are set to be the same and the orders of the disposing intervals are opposite in the first groove 11a and the second groove 11b has been described, but in the second embodiment, the case where the disposing intervals between the respective outer circumferential blades 22 in the first groove 11a and the second groove 11b are set to different values will be described. It should be noted that the same portions as the first embodiment are indicated by the same reference numerals, and the description thereof is omitted.

Figure 3:
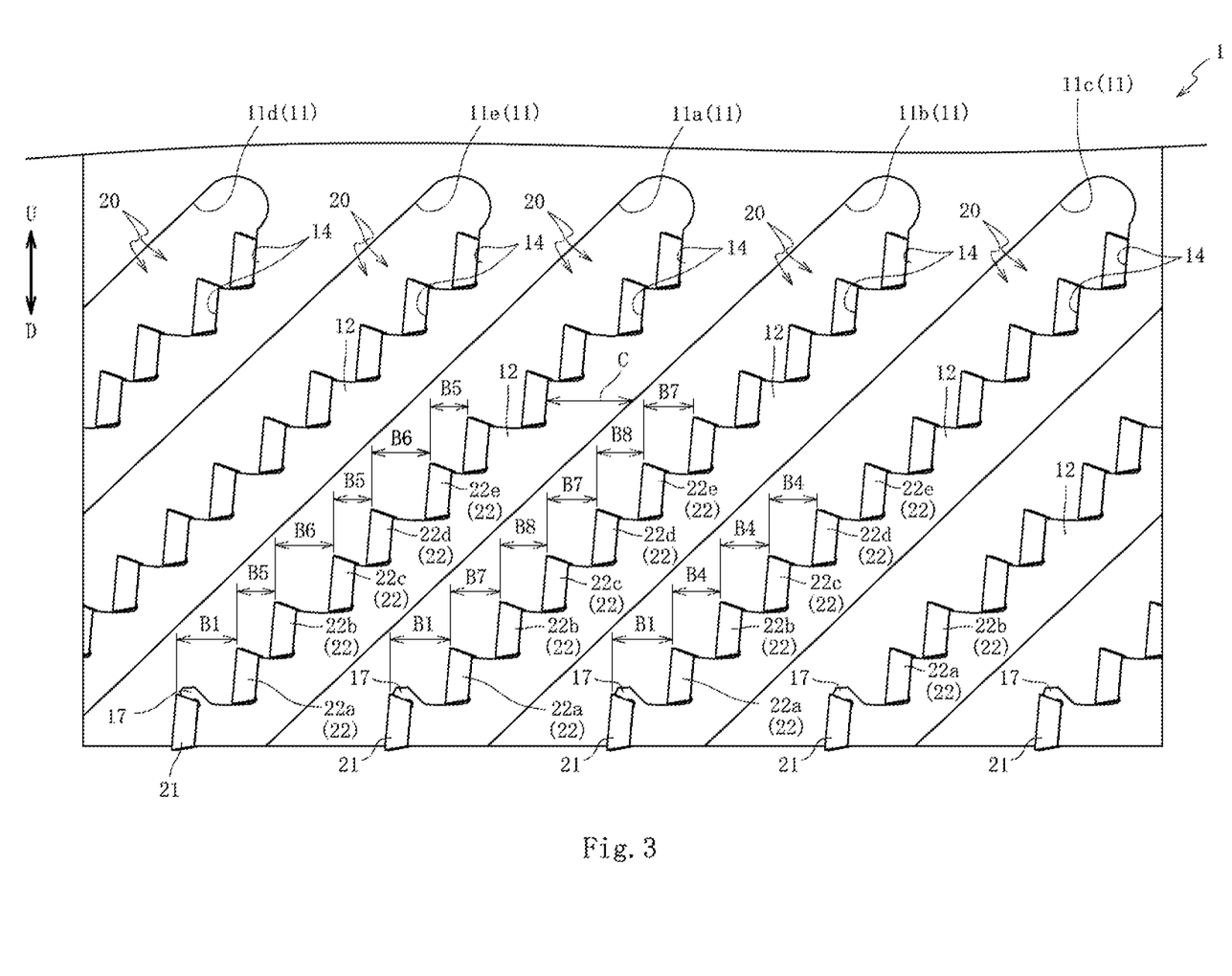
FIG. 3 is a schematic diagram developing the side face of the indexable cutting tool according to a second embodiment in the circumferential direction.

FIG. 3 is a schematic diagram developing the side face of the indexable cutting tool 1 according to the second embodiment in the circumferential direction.

As illustrated in FIG. 3, in the outer circumferential blades 22 disposed in the first groove 11a according to the second embodiment, a disposing interval B5 in the circumferential direction of the tool main body 10 from the first outer circumferential blade 22a to the second outer circumferential blade 22b (see FIG. 3) is set to a value smaller than the disposing interval B1 in the circumferential direction of the tool main body 10 from the bottom blade 21 to the first outer circumferential blade 22a (see FIG. 3) (B1>B5), and is set to a value smaller than a disposing interval B6 in the circumferential direction of the tool main body 10 from the second outer circumferential blade 22b to the third outer circumferential blade 22c (see FIG. 3) (B6>B5).

Like the first embodiment, disposing intervals in the circumferential direction of the tool main body 10 between the outer circumferential blades 22 adjacent to each other in the axis O direction on the coupling section 16 (see FIG. 1) side (the side in the arrow U direction) with respect to the third outer circumferential blade 22c in the first groove 11a are set to the intervals such that the disposing interval B5 from the first outer circumferential blade 22a to the second outer circumferential blade 22b in the first groove 11a and the disposing interval B6 from the second outer circumferential blade 22b to the third outer circumferential blade 22c in the first groove 11a are successively repeated.

Then, the outer circumferential blades 22 disposed in the second groove 11b will be described. In the outer circumferential blades 22 disposed in the second groove 11b, a disposing interval B7 in the circumferential direction of the tool main body 10 from the first outer circumferential blade 22a to the second outer circumferential blade 22b is set to be larger than the disposing interval B5 in the circumferential direction of the tool main body 10 between the outer circumferential blades 22 from the first outer circumferential blade 22a to the second outer circumferential blade 22b in the first groove 11a, and is set to be smaller than the disposing interval B6 in the circumferential direction of the tool main body 10 between the outer circumferential blades 22 from the second outer circumferential blade 22b to the third outer circumferential blade 22c in the first groove 11a.

A disposing interval B8 in the circumferential direction of the tool main body 10 from the second outer circumferential blade 22b to the third outer circumferential blade 22c in the second groove 11b (see FIG. 3) is set to be smaller than the disposing interval B7 in the circumferential direction of the tool main body 10 from the first outer circumferential blade 22a to the second outer circumferential blade 22b in the second groove 11b (see FIG. 3), is set to be larger than the disposing interval B5 in the circumferential direction of the tool main body 10 between the outer circumferential blades 22 from the first outer circumferential blade 22a to the second outer circumferential blade 22b in the first groove 11a, and is set to be smaller than the disposing interval B6 in the circumferential direction of the tool main body 10 between the outer circumferential blades 22 from the second outer circumferential blade 22b to the third outer circumferential blade 22c in the first groove 11a (B6>B7>B8>B5).

Like the first embodiment, disposing intervals in the circumferential direction of the tool main body 10 between the outer circumferential blades 22 adjacent to each other in the axis O direction on the coupling section 16 (see FIG. 1) side (the side in the arrow U direction) with respect to the third outer circumferential blade 22c in the second groove 11b are set to the intervals such that the disposing interval B7 from the first outer circumferential blade 22a to the second outer circumferential blade 22b in the second groove 11b and the disposing interval B8 from the second outer circumferential blade 22b to the third outer circumferential blade 22c in the second groove 11b are successively repeated.

Also, a value obtained by totaling the disposing interval B5 and the disposing interval B6 in the first groove 11a is set to a value obtained by totaling the disposing interval B7 and the disposing interval B8 in the second groove 11b. With this, the disposing intervals in the circumferential direction of the tool main body 10 between the outer circumferential blades 22 in the first groove 11a and between the outer circumferential blades 22 in the second groove 11b can be prevented from becoming large from the end face 13 (see FIG. 1) side (the side in the arrow D direction) toward the coupling section 16 (see FIG. 1) side (the side in the arrow U direction).

In the indexable cutting tool 1 configured as above, the disposing intervals in the circumferential direction of the tool main body 10 between the outer circumferential blades 22 disposed in the first groove 11a, the second groove 11b, the fourth groove 11d, and the fifth groove 11e are set to be unequal, so that the timings at which the outer circumferential blades 22 disposed in each of the first groove 11a, the second groove 11b, the fourth groove 11d, and the fifth groove 11e and adjacent to each other in the axis O direction are abutted on the workpiece during the cutting process by the indexable cutting tool 1 can be unequal. As a result, the vibrations transmitted to the tool main body 10 during the cutting process for the workpiece at the outer circumferential blades 22 disposed in the first groove 11a, the second groove 11b, the fourth groove 11d, and the fifth groove 11e can be irregular. As a result, the periodic vibrations during the cutting process can be prevented from being resonated to inhibit the occurrence of chatter vibration.

Also, the disposing intervals between the outer circumferential blades 22 in the circumferential direction of the tool main body 10 in the first groove 11a and the second groove 11b are different, so that the vibrations distributed by the disposing intervals between the outer circumferential blades 22 disposed in the respective grooves 11 can be prevented from being resonated. As a result, the periodic vibrations during the cutting process can be easily prevented from being resonated to easily inhibit the occurrence of chatter vibration.

The present invention has been described above based on the embodiments, but the present invention is not limited to the embodiments at all, and it can be easily inferred that various modifications can be made within the scope not departing from the purport of the present invention.

For example, the numerical values given in the embodiments are examples, and of course, other numerical values can be adopted.

In the first and the second embodiments, the case where the five grooves 11 are recessed has been described, but the present invention is not necessarily limited to this. For example, two grooves 11 may be recessed, and six grooves 11 may be recessed. It should be noted that also in these cases, like the first embodiment, the disposing intervals in the circumferential direction of the tool main body 10 between the outer circumferential blades 22 disposed in at least one groove 11 are preferably set to be unequal.

In the first and the second embodiments, the case where the outer circumferential blades 22 disposed in the third groove 11c are set to be at equal intervals in the circumferential direction of the tool main body 10 has been described, but the present invention is not necessarily limited to this. For example, the outer circumferential blades 22 disposed in the third groove 11c may be disposed at unequal intervals in the circumferential direction of the tool main body 10. In this case, the disposing intervals between the outer circumferential blades 22 in the third groove 11c in the circumferential direction of the tool main body 10 are preferably set to values different from the values of the disposing intervals in the circumferential direction of the tool main body 10 between the outer circumferential blades 22 in the first groove 11a and the second groove 11b.

With this, the disposing intervals between the outer circumferential blades 22 in the first groove 11a and the second groove 11b in the same position in the axis O direction can be easily made different. Thus, the timings at which the outer circumferential blades 22 disposed in the first groove 11a and the second groove 11b and the outer circumferential blades 22 disposed in the third groove 11c are abutted on the workpiece during the cutting process can be easily unequal. Therefore, the vibrations transmitted to the tool main body 10 during the cutting process for the workpiece at the outer circumferential blades 22 disposed in the first groove 11a and the second groove 11b can be irregular. As a result, the periodic vibrations during the cutting process can be prevented from being resonated to inhibit the occurrence of chatter vibration.

In the first and the second embodiments, the case where the disposing intervals in the circumferential direction of the tool main body 10 between the outer circumferential blades 22 disposed in the first groove 11a and the second groove 11b are set to the two types has been described, but the present invention is not necessarily limited to this, and for example, the disposing intervals in the circumferential direction of the tool main body 10 between the outer circumferential blades 22 disposed in the first groove 11a and the second groove 11b may be set to three types or more.

In the first and the second embodiments, the case where the axial rake angle of each of the bottom blades 21 is set to be smaller than the axial rake angle of each of the outer circumferential blades 22 has been described, but the present invention is not necessarily limited to this, and for example, the axial rake angle of the bottom blade 21 may be set to be the same as the axial rake angle of the outer circumferential blade 22.

The invention claimed is:

1. An indexable cutting tool that includes a tool main body rotated in a rotation direction about an axis, a plurality of grooves rotated along an outer circumferential face of the tool main body and extending in an axial direction and having rotating directions respectively set to be identical with respect to the outer circumferential face of the tool main body, a plurality of bottom blades disposed at one end in the axial direction of the tool main body in the grooves, and a plurality of outer circumferential blades disposed at another end side in the axial direction of the tool main body with respect to the bottom blades in the grooves,
wherein axial rake angles of the outer circumferential blades are set to an identical angle in respective ones of the plurality of outer circumferential blades, and radial rake angles of the outer circumferential blades are set to an identical angle in the respective ones of the plurality of outer circumferential blades,
wherein at last one groove of the plurality of grooves is configured as a first groove,
wherein disposing intervals in the rotation direction of the tool main body between the plurality of outer circumferential blades disposed in the first groove are set to two types of disposing intervals of a first interval and a second interval larger than the first interval,
wherein at last one groove of the plurality of grooves is configured as a second groove,
wherein disposing intervals in the rotation direction of the tool main body between the plurality of outer circumferential blades disposed in the second groove are set to two types of disposing intervals of a third interval and a fourth interval larger than the third interval,
wherein the disposing intervals between the outer circumferential blades in the first groove are repeated in the rotation direction of the tool main body in a first order of the first interval and the second interval,
wherein the disposing intervals between the outer circumferential blades in the second groove are repeated in the rotation direction of the tool main body in a second order of the fourth interval and the third interval,
wherein at last one groove of the plurality of grooves is configured as a third groove,
wherein a first interval pattern of the outer circumferential blades disposed in the first groove is different from a second interval pattern of the outer circumferential blades disposed in the second groove, and
wherein all disposing intervals in the rotation direction of the tool main body between the plurality of outer circumferential blades disposed in the third groove are identical.

2. The indexable cutting tool according to claim 1, wherein the disposing intervals between the plurality of outer circumferential blades disposed in the third groove are set to an average value of the first interval and the second interval.

3. The indexable cutting tool according to claim 1, wherein in the bottom blades, disposing intervals between the bottom blades in the rotation direction of the tool main body are respectively set to different intervals.

4. The indexable cutting tool according to claim 3, wherein a disposing interval in the rotation direction of the tool main body from each of the bottom blades to the outer circumferential blade adjacent to the respective bottom blade in a circumferential direction opposite the rotation direction of the tool main body is set to be larger than the first second, third, fourth and fifth disposing intervals between the plurality of outer circumferential blades in the rotation direction of the tool main body.

5. An indexable cutting tool that includes a tool main body rotated in a rotation direction about an axis, a plurality of grooves rotated along an outer circumferential face of the tool main body and extending in an axial direction and having rotating directions respectively set to be identical with respect to the outer circumferential face of the tool main body, a plurality of bottom blades disposed at one end in the axial direction of the tool main body in the grooves, and a plurality of outer circumferential blades disposed at another end side in the axial direction of the tool main body with respect to the bottom blades in the grooves,
wherein axial rake angles of the outer circumferential blades are set to an identical angle in respective ones of the plurality of outer circumferential blades, and radial rake angles of the outer circumferential blades are set to an identical angle in the respective ones of the plurality of outer circumferential blades,
wherein at last one groove of the plurality of grooves is configured as a first groove,
wherein disposing intervals in the rotation direction of the tool main body between the plurality of outer circumferential blades disposed in the first groove are set to two types of disposing intervals of a first interval and a second interval larger than the first interval,
wherein at last one groove of the plurality of grooves is configured as a second groove,
wherein disposing intervals in the rotation direction of the tool main body between the plurality of outer circumferential blades disposed in the second groove are set to two types of disposing intervals of a third interval and a fourth interval larger than the third interval,
wherein the disposing intervals between the outer circumferential blades in the first groove are repeated in a circumferential direction opposite the rotation direction of the tool main body in a first order of the first interval and the second interval starting from a first of the outer circumferential blades nearest the one end in the first groove, wherein the disposing intervals between the outer circumferential blades in the second groove are repeated in a circumferential direction opposite the rotation direction of the tool main body in a second order of the fourth interval and the third interval starting from a first of the outer circumferential blades nearest the one end in the second groove, wherein a first value obtained by totaling the first interval and the second interval is set to a second value obtained by totaling the third interval and the fourth interval.

6. The indexable cutting tool according to claim 5, wherein the first interval is set to a value different from a value of the third interval, and the second interval is set to a value different from a value of the fourth interval.

7. The indexable cutting tool according to claim 5, wherein the first interval is set to an equal value as the third interval, and the second interval is set to an equal value as the fourth interval.

* * * * *